US012573881B2

(12) United States Patent (10) Patent No.: US 12,573,881 B2

Yamamoto et al. (45) Date of Patent: Mar. 10, 2026

(54) POWER SUPPLY DEVICE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Yasuyuki Yamamoto, Osaka (JP); Hidetoshi Ishida, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 18/836,014

(22) PCT Filed: Feb. 9, 2023

(86) PCT No.: PCT/JP2023/004305

§ 371 (c)(1),
(2) Date: Aug. 6, 2024

(87) PCT Pub. No.: WO2023/153467

PCT Pub. Date: Aug. 17, 2023

(65) Prior Publication Data

US 2025/0118991 A1 Apr. 10, 2025

(30) Foreign Application Priority Data

Feb. 10, 2022 (JP) ................................. 2022-019496

(51) Int. Cl.
H02J 50/10 (2016.01)
B60N 2/07 (2006.01)
(Continued)

(52) U.S. Cl.
CPC ............ *H02J 50/10* (2016.02); *B60N 2/0722* (2013.01); *B60N 2/14* (2013.01); *H02J 50/90* (2016.02)

(58) Field of Classification Search
CPC .. H02J 50/10; H02J 50/12; H02J 50/90; H02J 50/005; H02J 50/70; B60R 16/027; B60R 16/02; B60N 2/14; B60N 2/06
See application file for complete search history.

(56) References Cited

U.S. PATENT DOCUMENTS

2017/0155268 A1* 6/2017 Ayotte .................. H02J 7/0042
2020/0099214 A1* 3/2020 Sano ........................ H01B 7/08
(Continued)

FOREIGN PATENT DOCUMENTS

JP 2010-288430 A 12/2010
JP 2015-134513 A 7/2015
JP 2021-065013 A 4/2021

OTHER PUBLICATIONS

International Search Report issued on Apr. 18, 2023 for WO 2023/153467 A1 (4 pages).

*Primary Examiner* — Rexford N Barnie
*Assistant Examiner* — Rasem Mourad
(74) *Attorney, Agent, or Firm* — LICA, Inc

(57) ABSTRACT

A power supply device 10 configured to supply power to a seat S that is movable relative to a floor F of a vehicle includes a power receiving unit 20 that includes a power receiving coil 24 and configured to move along with the seat S, a power transmitting unit 30 that includes a power transmitting coil 34 disposed opposing the power receiving coil 24 and configured to supply power to the power receiving coil 24 in a contactless manner and a power transmitting extension portion 35 extending from the power transmitting coil 34, the power transmitting unit 30 being configured to move along with the seat S and the power (Continued)

receiving unit 20, and a slack absorption portion 40 that includes a winding portion 45 configured to wind and feed the power transmitting extension portion 35 by rotating in coordination with the movement of the seat S.

5 Claims, 6 Drawing Sheets

(51) Int. Cl.
    *B60N 2/14*        (2006.01)
    *H02J 50/90*     (2016.01)

(56) References Cited

U.S. PATENT DOCUMENTS

2020/0223378 A1\* 7/2020 Mushiake ................ H04B 5/79
2020/0223379 A1\* 7/2020 Kikkawa ............... B60R 16/027

\* cited by examiner

POWER SUPPLY DEVICE

CROSS REFERENCE TO RELATED APPLICATIONS

This application is a national phase of PCT application No. PCT/JP2023/004305, filed on 9 Feb. 2023, which claims priority from Japanese patent application No. 2022-019496, filed on 10 Feb. 2022, all of which are incorporated herein by reference.

TECHNICAL FIELD

The present disclosure relates to a power supply device.

BACKGROUND

There are power supply mechanisms that supply power to a slidable seat mounted in a vehicle in a contactless manner. These power supply mechanisms include a power supply unit disposed in a lower portion and having a power supply coil, and a power receiving unit disposed in a slide seat and having a power receiving coil. The power receiving coil is disposed at a plurality of locations in the slide seat and supplied with power from the power supply coil through electromagnetic introduction in a contactless manner.

PRIOR ART DOCUMENT

Patent Document

Patent Document 1: JP 2015-134513 A

SUMMARY OF THE INVENTION

Problems to be Solved

However, in the above-described power supply device, if the distances of the power receiving coils from the power supply coil increase due to the movement of the slide seat, a problem may occur in power supply from the power supply unit to the power receiving unit. In order to avoid such a situation, the power supply coil needs to be set to a size corresponding to the entire movement range of the power receiving coils, which increases the area occupied by the power supply coil.

Means to Solve the Problem

A power supply device disclosed in the present specification is a power supply device configured to supply power to a movable member that is movable relative to a vehicle body of a vehicle, the power supply device including a power receiving unit that includes a power receiving coil and is configured to move along with the movable member, a power transmitting unit that includes a power transmitting coil disposed opposing the power receiving coil and configured to supply power to the power receiving coil in a contactless manner and a power transmitting extension portion extending from the power transmitting coil, the power transmitting unit being configured to move along with the movable member and the power receiving unit, and a slack absorption portion that includes a winding portion configured to wind and feed the power transmitting extension portion by rotating in coordination with movement of the movable member.

Effect of the Invention

According to the technique disclosed in the present specification, it is possible to provide a compact power supply device that can efficiently supply power to a movable member in a contactless manner.

DETAILED DESCRIPTION TO EXECUTE THE INVENTION

Figure 1:
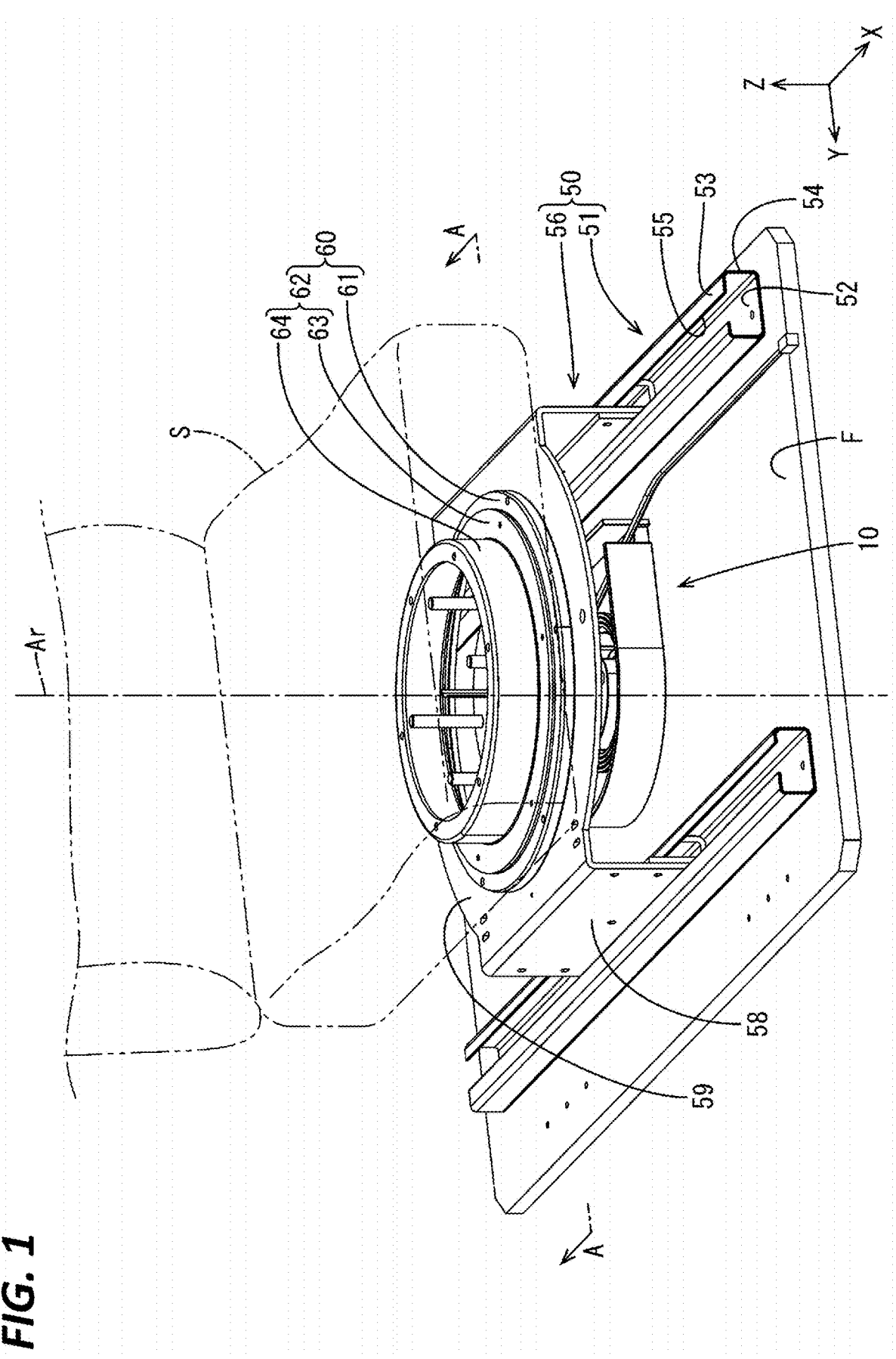
FIG. 1 is a perspective view showing a state in which a power supply device of an embodiment is attached to a seat and a slide mechanism of the seat.

Overview of Embodiment (1) A power supply device disclosed in the present specification is a power supply device configured to supply power to a movable member that is movable relative to a vehicle body of a vehicle, the power supply device including a power receiving unit that includes a power receiving coil and is configured to move along with the movable member, a power transmitting unit that includes a power transmitting coil disposed opposing the power receiving coil and configured to supply power to the power receiving coil in a contactless manner and a power transmitting extension portion extending from the power transmitting coil, the power transmitting unit being configured to move along with the movable member and the power receiving unit, and a slack absorption portion that includes a winding portion configured to wind and feed the power transmitting extension portion by rotating in coordination with movement of the movable member.

According to the above configuration, since the power receiving unit and the power transmitting unit move along with the movable member, a relative positional relationship between the power receiving coil and the power transmitting coil is always kept within a constant range. Accordingly, power can be efficiently supplied and the power supply device can be downsized. Also, the slack absorption portion that accommodates the slack portion of the power transmitting extension portion generated due to the movement of the power transmitting unit includes the winding portion for winding and feeding the power transmitting extension portion according to the movement of the power transmitting unit, the slack absorption portion can be downsized, and the entire power supply device can be downsized.

(2) In the power supply device in (1), a configuration is also possible in which the movable member is rotatable relative to the vehicle body, and the power receiving coil and the power transmitting coil are disposed around a rotational axis of the movable member.

With this configuration, even when the movable member rotates, the positional relationship between the power receiving coil and the power transmitting coil is kept within a constant range, and thus even if the movable member is rotated in any manner, power can be efficiently supplied in a contactless manner.

(3) In the power supply device in (1) or (2), a configuration is also possible in which the movable member is a seat. The above configuration is suitable for a power supply device for supplying power to the seat that is movable with respect to the floor of a vehicle.

Details of Embodiments of the Disclosure

Specific examples of a technique disclosed in the present specification will be described below with reference to the drawings. It should be noted that the present invention is not intended to be limited to these examples, but rather is indicated by the claims, and is intended to include all modifications within the meaning and scope equivalent to the scope of claims.

Overall Configuration

The following describes an embodiment with reference to FIGS. 1 to 6. A power supply device 10 of the present embodiment supplies power to electrical components included in a seat S mounted in a vehicle such as an automobile. In the following description, the X-axis direction in FIG. 1 is the front-rear direction, the Y-axis direction is the left-right direction, and the Z-axis direction is the up-down direction.

Figure 2:
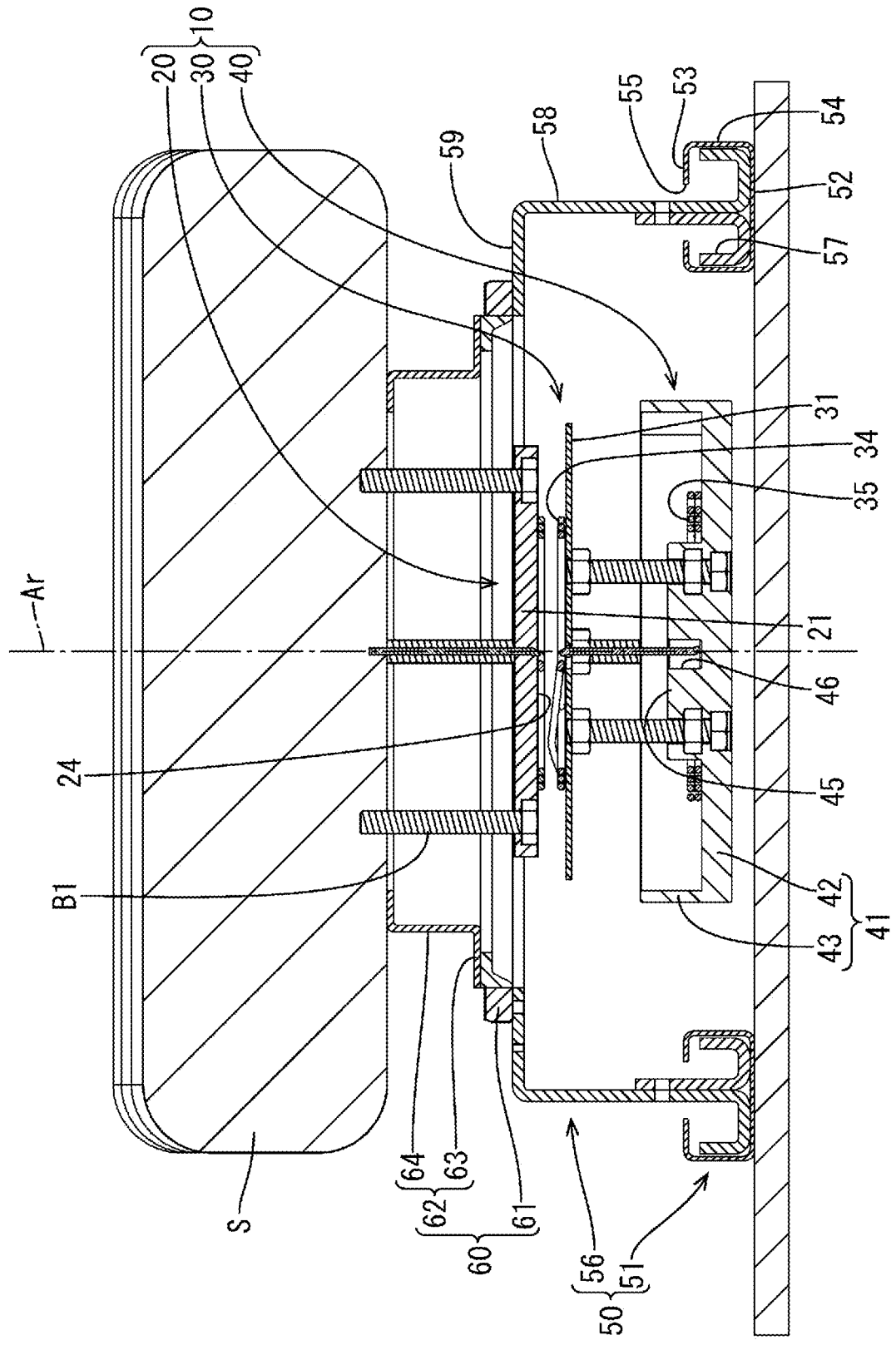
FIG. 2 is a cross-sectional view taken along line A-A in FIG. 1.

As shown in FIGS. 1 and 2, the seat S is attached to a floor F of a compartment of the vehicle via a slide mechanism 50 and a rotation mechanism 60, and is capable of moving in the front-rear direction and rotating, with respect to the floor F. The seat S includes various electrical components such as an electric reclining device, a seat heater, a sensor that detects whether an occupant is seated, and a sensor that detects whether a seatbelt is worn.

[Slide Mechanism 50]

As shown in FIGS. 1 and 2, the slide mechanism 50 includes two metal rails 51 fixed to the floor F, and a slider 56 slidably attached to the rails 51.

The two rails 51 are arranged in parallel and spaced apart from each other. The rails 51 each have a rectangular tube shape linearly extending in the front-rear direction, and include a lower wall 52, an upper wall 53 opposing the lower wall 52, and two side walls 54 linking the lower wall 52 and the upper wall 53 to each other. Each upper wall 53 includes a slit 55 extending in the front-rear direction.

The slider 56 includes two rail insertion portions 57 respectively housed in the two rails 51 so as to be capable of moving in the front-rear direction, and two leg portions 58 respectively extending upward from the two rail insertion portions 57, the two leg portions 58 respectively extending upward from the two rail insertion portions 57, and a support plate portion 59 connecting the upper end edges of the two leg portions 58, inside the two rails 51. The two leg portions 58 have a plate shape and extend upward from the two rail insertion portions 57 via the slits 55, respectively. The two leg portions 58 oppose each other. The support plate portion 59 has a substantially annular plate shape.

For example, the seat S moves in the front-rear direction due to a manual operation by the user or a driving mechanism such as a motor connected to the slider 56 being driven by operating an operation means such as a slide switch by the user.

[Rotation Mechanism 60]

The rotation mechanism 60 is made of metal, and includes a base pedestal 61 fixed to the support plate portion 59 and a seat pedestal 62 rotatably attached to the base pedestal 61, as shown in FIGS. 1 and 2. The base pedestal 61 has an annular plate shape, and is fixed to the support plate portion 59 by being fasten by a bolt, for example.

The seat pedestal 62 includes an annular plate shaped flange portion 63 that is slightly smaller than the base pedestal 61 and a cylindrical seat support portion 64 extending upward from the flange portion 63. The flange portion 63 is attached to the base pedestal 61 via a bearing or the like, and with this, the seat pedestal 62 is rotatably attached to the base pedestal 61 and the slider 56. The seat support portion 64 is fixed to the lower surface of the seat S. The seat S is configured to rotate about a rotational axis Ar shown in FIG. 1 with respect to the floor F by the seat pedestal 62 rotating with respect to the base pedestal 61. Since the rotation mechanism 60 and the seat S are attached to the slider 56, they are configured to move in the front-rear direction following the movement of the slider 56 in the front-rear direction.

For example, the seat S rotates by the manual operation of the user, or due to the driving device such as a motor for rotating the seat S being driven according to the user operation of an operational means such a rotation switch.

[Power Supply Device 10]

As shown in FIG. 2, the power supply device 10 includes a power receiving unit 20, a power transmitting unit 30 that supplies power to the power receiving unit 20 through an electromagnetic induction method in a contactless manner, and a slack absorption portion 40 attached to the power transmitting unit 30.

[Power Receiving Unit 20]

Figure 3:
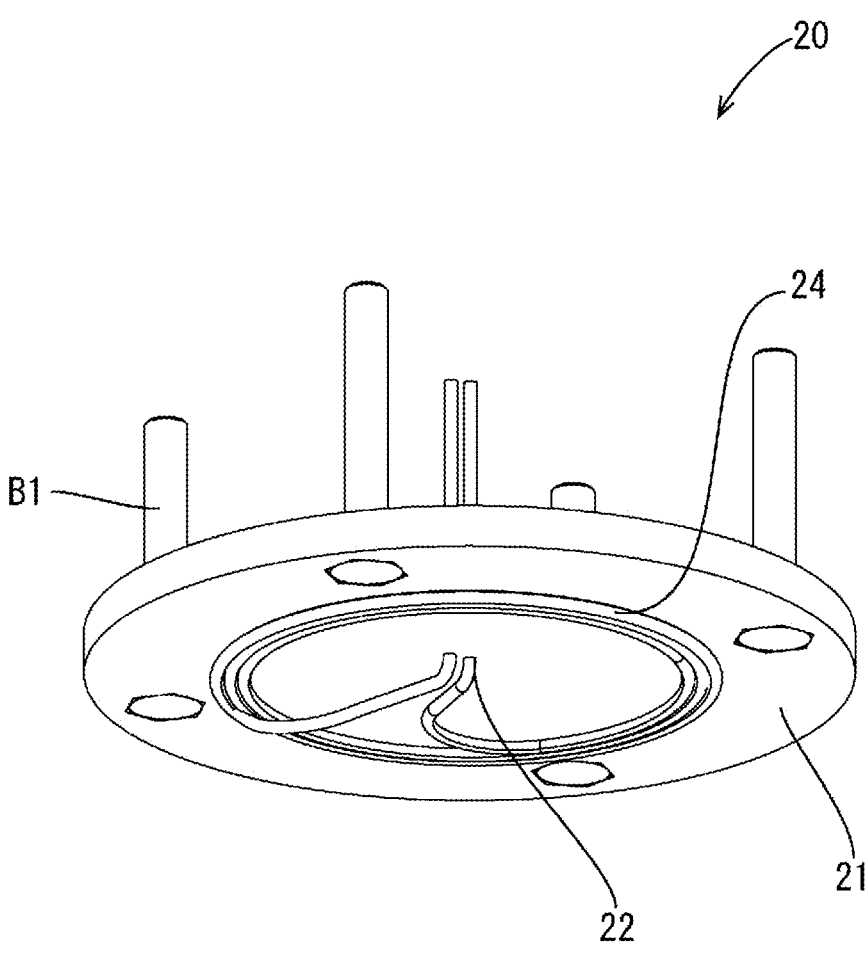
FIG. 3 is a perspective view of a power receiving unit of the embodiment.

The power receiving unit 20 includes a first coil board 21 and a power receiving coil 24 supported by the first coil board 21, as shown in FIGS. 2 and 3.

The first coil board 21 is made of synthetic resin and has a disk shape. The first coil board 21 is disposed below the seat S and fixed to a lower surface of the seat S by a bolt B1 made of synthetic resin.

The power receiving coil 24 has an annular shape in which a wire is wound a plurality of times. For example, a wire formed by a copper wire coated by an insulating layer such as enamel, for example, can be used as a wire that forms the power receiving coil 24. The power receiving coil 24 is disposed at the lower surface of the first coil board 21 concentrically with respect to the first coil board 21. The power receiving coil 24 may be attached to the first coil board 21 by a known method such as welding through ultrasonic welding or thermal welding, adhesion with a pressure-sensitive adhesive or an adhesive, or may be held by a holding member attached to the first coil board 21. One end portion of the wire that forms the power receiving coil 24 is inserted into a first insertion hole 22 in the first coil board 21 to be guided inside the seat S, and connected to an electrical component installed inside the seat S via a rectification circuit. The rectification circuit converts an alternating current supplied from the power receiving coil 24 into a direct current and supplies the resultant direct current to the electrical component.

The power receiving unit 20 is fixed to the seat S and configured to move in the front-rear direction along with the seat S in coordination with the movement of the slider 56. Also, the first coil board 21 and the power receiving coil 24 are arranged concentrically with the seat pedestal 62. That is, the first coil board 21 and the power receiving coil 24 are connected to the seat S and arranged such that the rotational axis Ar of the seat S passes the center position, and thus the seat S, the first coil board 21, and the power receiving coil 24 rotate in coordination with each other about the common rotational axis Ar.

[Power Transmitting Unit 30]

Figure 4:
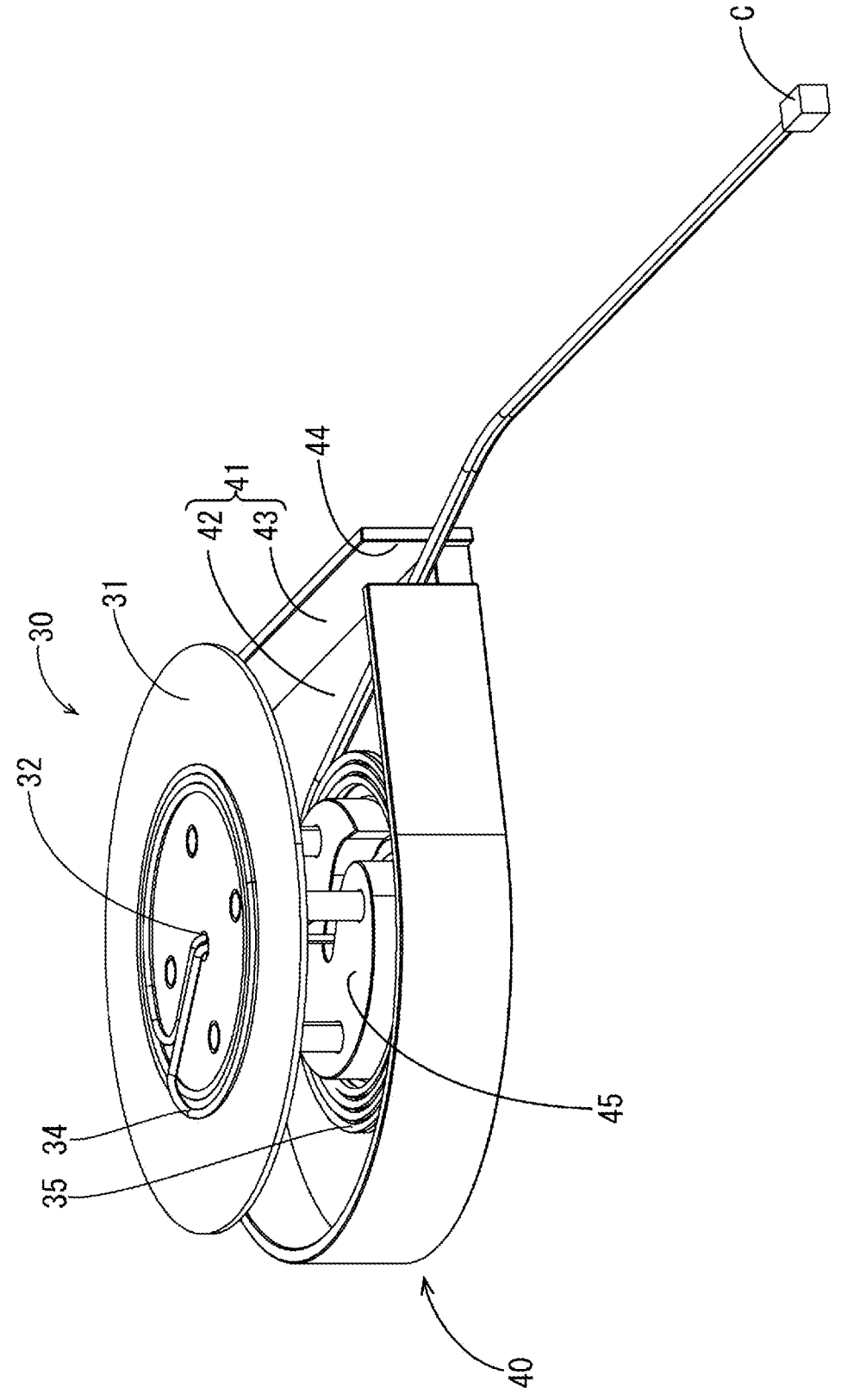
FIG. 4 is a perspective view of a power transmitting unit and a slack absorption portion of the embodiment.
Figure 5:
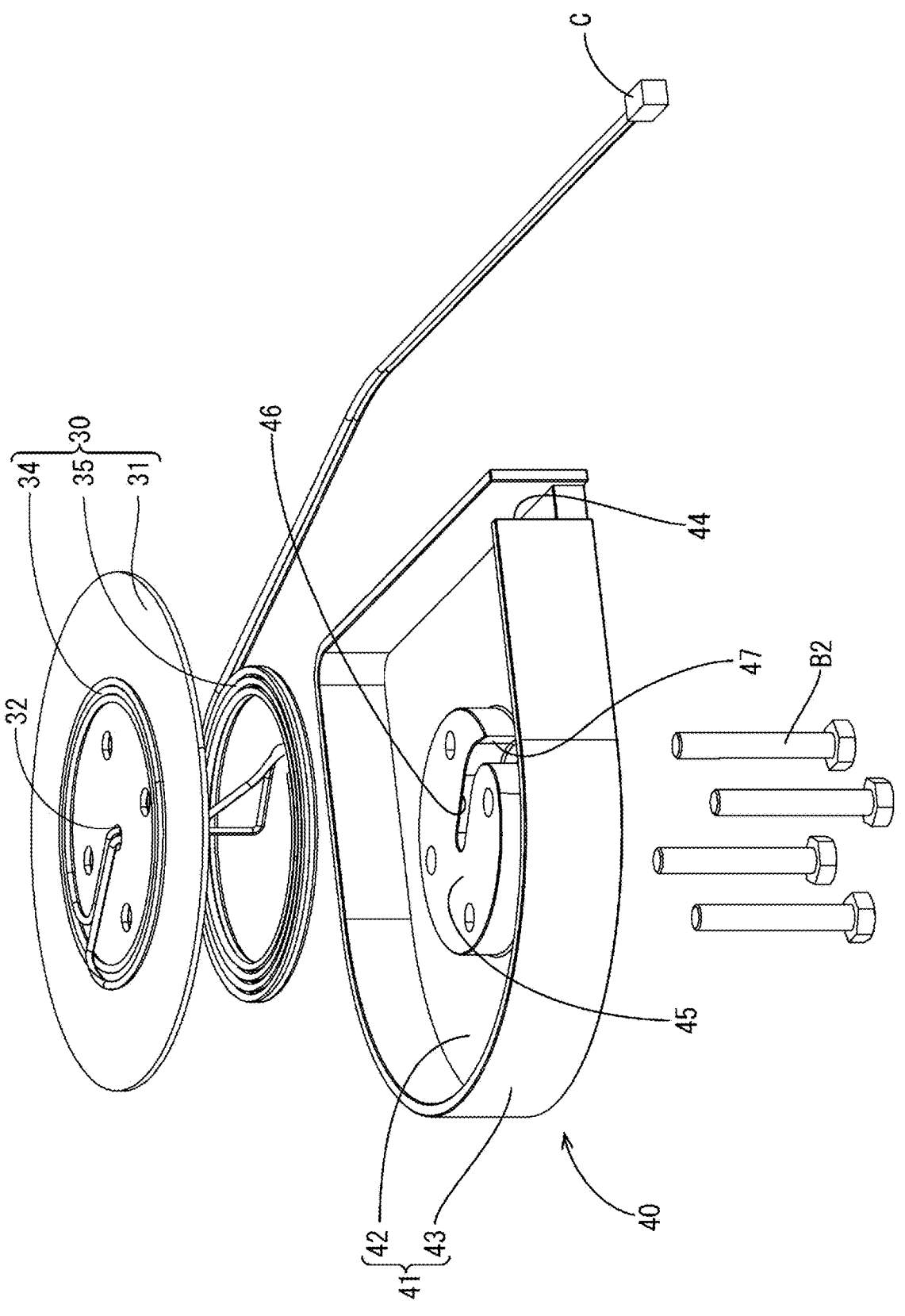
FIG. 5 is an exploded perspective view of the power transmitting unit and the slack absorption portion of the embodiment.

As shown in FIGS. 2, 4, and 5, the power transmitting unit 30 includes a second coil board 31, a power transmitting coil 34 supported by the second coil board 31, and a power transmitting extension portion 35 extending from the power transmitting coil 34.

The second coil board 31 is made of synthetic resin and has a disk shape. The second coil board 31 is disposed below the first coil board 21 so as to oppose the first coil board 21. The second coil board 31 is disposed coaxially with respect to the first coil board 21.

The power transmitting coil 34 has an annular shape in which a wire is wound a plurality of times. For example, a copper wire coated by an insulating layer such as enamel can be used as a wire that forms the power transmitting coil 34. The power transmitting coil 34 is arranged on an upper surface of the second coil board 31 concentrically with the second coil board 31. In other words, the power transmitting coil 34 is disposed coaxially with the power receiving coil 24 and opposing the power receiving coil 24. The power transmitting coil 34 may be attached to the second coil board 31 using a known method, such as ultrasonic welding or thermal welding, adhesion with a pressure-sensitive adhesive, an adhesive, or the like, or may be held by a holding member attached to the second coil board 31. One end portion of the wire that forms the power transmitting coil 34 is inserted into a second insertion hole 32 in the second coil board 31 to be guided to a space below the second coil board 31, and connected to the power transmitting extension portion 35 via a high frequency conversion circuit disposed below the second coil board 31. The power transmitting extension portion 35 is connected to a floor harness laid under the floor of the vehicle via a connector C attached to the terminal portion, and the floor harness is connected to a power source device provided in the vehicle. The high frequency conversion circuit converts a direct current supplied from the power source device via the floor harness and the power transmitting extension portion 35 into an alternative current and supplies the alternative current to the power transmitting coil 34.

[Slack Absorption Portion 40]

The slack absorption portion 40 is made of synthetic resin, disposed below the second coil board 31, and is attached to the second coil board 31 by a plurality of bolts B2 made of synthetic resin. As shown in FIGS. 2, 4, and 5, the slack absorption portion 40 includes a case 41 and a winding portion 45 disposed inside the case 41. The case 41 includes a plate-shaped bottom wall portion 42 and a peripheral wall portion 43 that extends upward from a peripheral edge of the bottom wall portion 42. The peripheral wall portion 43 includes a first guiding port 44 into which a terminal portion of the power transmitting extension portion 35 can be inserted. The winding portion 45 has a thick disk shape, and is disposed coaxially with the second coil board 31 on the upper surface of the bottom wall portion 42. The winding portion 45 includes an accommodating groove 46 that accommodates the power transmitting extension portion 35. The accommodating groove 46 includes a second guiding port 47 in an outer peripheral surface of the winding portion 45, and extends toward a center portion of the winding portion 45 from the second guiding port 47.

Figure 6:
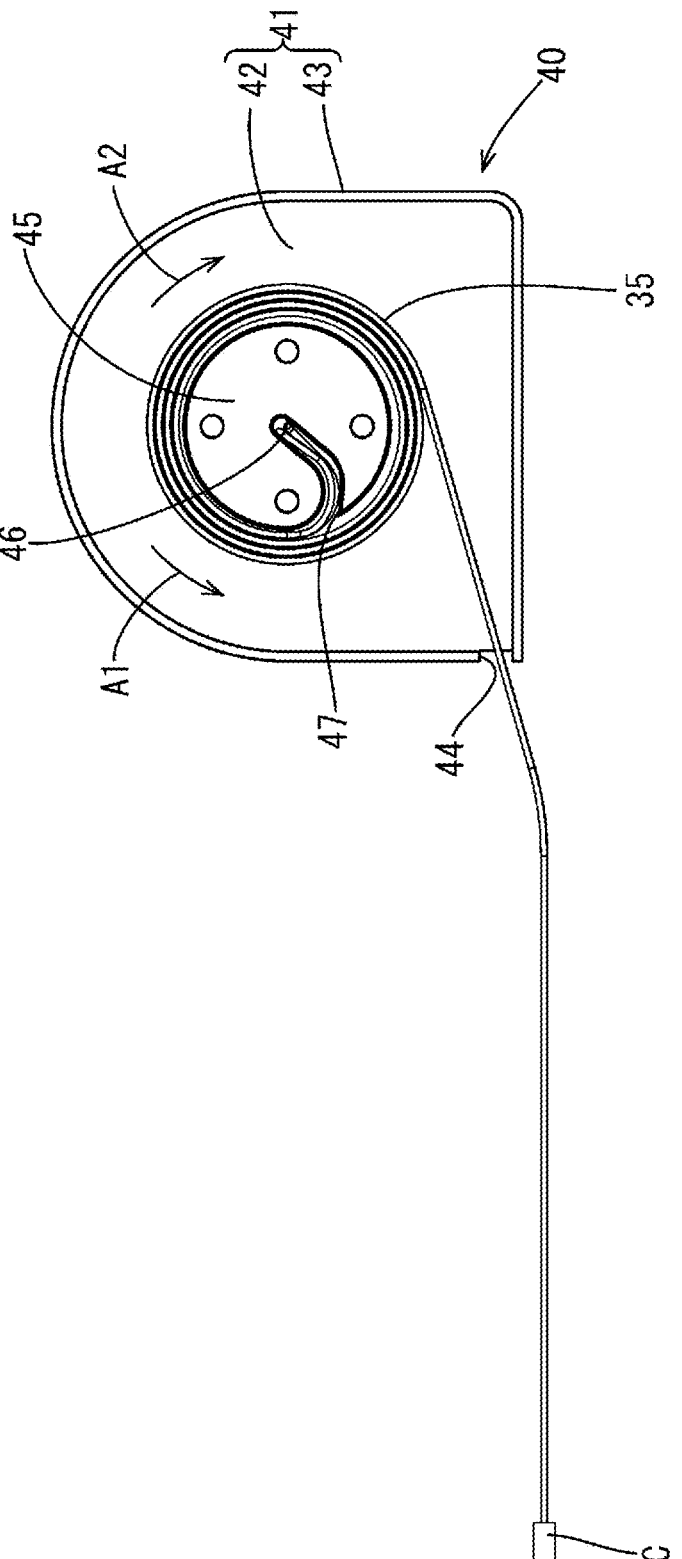
FIG. 6 is a plan view of the slack absorption portion and a power transmitting extension portion of the embodiment.

Most of the power transmitting extension portion 35 is accommodated in the case 41. As shown in FIG. 6, the power transmitting extension portion 35 is guided out through the second guiding port 47 via the accommodating groove 46, and wound around the winding portion 45. The distal end portion of the power transmitting extension portion 35 is guided out to the outside of the case 41 through the first guiding port 44, extends forward (toward the bottom-right side in FIG. 1) along the slider 56, and is connected to the floor harness laid under the floor of the vehicle via a connector C.

[Operations of Power Receiving Unit 20, Power Transmitting Unit 30, and Slack Absorption Portion 40 Following Movement of Seat S]

As described above, the power receiving unit 20 is configured to move in the front-rear direction along with the seat S in coordination with the movement of the slider 56. Also, the first coil board 21 and the power receiving coil 24 rotate following the rotation of the seat S, about the rotational axis Ar that is common with the rotational axis of the seat S.

On the other hand, the power transmitting unit 30 and the slack absorption portion 40 are linked to the slider 56 via a link mechanism (not shown), and configured to move in the front-rear direction along with the seat S following the movement of the slider 56. The link mechanism includes a driving mechanism such as a motor for rotating the power transmitting unit 30 and the slack absorption portion 40 in coordination with the movement of the slider 56. Here, as shown in FIG. 2, since the second coil board 31 and the power transmitting coil 34 are disposed coaxially with the first coil board 21, the rotational axis Ar of the seat S passes the center position thereof. Accordingly, the second coil board 31 and the power transmitting coil 34 rotate about the rotational axis Ar that is common with the rotational axes of the seat S, the first coil board 21 and the power receiving coil 24.

In this manner, the power receiving unit 20 and the power transmitting unit 30 move in the front-rear direction along with the seat S following the movement of the slider 56. Also, the power receiving coil 24 and the power transmitting coil 34 rotate about the common rotational axis Ar. Accordingly, even if the seat S moves or rotates, the relative positional relationship between the power receiving coil 24 and the power transmitting coil 34 is always kept constant. With this configuration, it is possible to avoid a situation where the positions of the power receiving coil 24 and the power transmitting coil 34 are displaced from each other due to the movement of the seat S and a problem may occur in power supply. In general, in the electromagnetic induction method, magnetic flux of a power transmitting coil that does not interlink with a power receiving coil becomes leakage magnetic flux. If the positions of the power receiving coil and the power transmitting coil are displaced, the leakage magnetic flux may increase. In the present embodiment, since the positions of the power receiving coil 24 and the power transmitting coil 34 are not displaced from each other due to the movement of the seat S, an increase in the leakage magnetic flux can be avoided and power can be efficiently supplied.

Also, since the power transmitting unit 30 moves following the movement of the slider 56, a slack is generated in the power transmitting extension portion 35 depending on the position to which the power transmitting unit 30 moves. In the present embodiment, the slack absorption portion 40 rotates in coordination with the movement of the slider 56 and performs winding and feeding of the power transmitting extension portion 35. When the slider 56 moves forward (leftward in FIG. 6), the slack absorption portion 40 rotates in the direction indicated by an arrow A1 in FIG. 6, and the power transmitting extension portion 35 is wound by the winding portion 45. When the slider 56 moves rearward (rightward in FIG. 6), the slack absorption portion 40 rotates in the direction indicated by an arrow A2 in FIG. 6, and the power transmitting extension portion 35 is released from the winding portion 45 and fed from the case 41. In this manner, since the slack absorption portion 40 is configured to compactly accommodate the slack portion of the power transmitting extension portion 35, the slack absorption portion 40 can be downsized and the entire power supply device 10 can be downsized.

[Operation and Effects]

As described above, according to the present embodiment, the power supply device 10 that supplies power to the seat S that is movable relative to the floor F of the vehicle includes the power receiving unit 20 that includes the power receiving coil 24 and moves together with the seat S, the power transmitting coil 34 that is disposed opposing the power receiving coil 24 and supplies power to the power receiving coil 24 in a contactless manner, the power transmitting extension portion 35 extending from the power transmitting coil 34, the power transmitting unit 30 that moves together with the seat S and the power receiving unit 20, and the slack absorption portion 40 that includes the winding portion 45 that winds and feeds the power transmitting extension portion 35 by rotating in coordination with the movement of the seat S.

With the above configuration, since the power receiving unit 20 and the power transmitting unit 30 move following the movement of the seat S, the relative positional relationship between the power receiving coil 24 and the power transmitting coil 34 is always kept within a constant range. Accordingly, power can be supplied more efficiently. In addition, since the slack absorption portion 40 includes the winding portion 45 that winds and feeds the power transmitting extension portion 35 following the movement of the power transmitting unit 30, the slack absorption portion 40 can be downsized and the entire power supply device 10 can be downsized.

Further, the seat S is rotatable relative to the floor F, and the power receiving coil 24 and the power transmitting coil 34 are disposed around the rotational axis Ar of the seat S.

With this configuration, even if the seat S rotates, the positional relationship between the power receiving coil 24 and the power transmitting coil 34 is kept within a constant range, and thus even if the seat S is rotated in any manner, power can be efficiently supplied in a contactless manner.

Other Embodiments (1) Although the above embodiment describes that the movable member is the seat S, the movement member is not limited to a seat and may be a sliding door, for example.

(2) Although the above embodiment describes that the movement of the seat S is linear movement using the rails 51 and the slider 56, the mode of movement of the movable member is not limited to linear movement and may be movement along a moving path having a curved shape or a crank shape or free movement within a predetermined range.

(3) Although the above embodiment describes that the power receiving coil 24 and the power transmitting coil 34 rotate about the common rotational axis Ar, the rotational axes of the power receiving coil and the power transmitting coil do not need to be completely aligned. It is sufficient that both the power receiving coil and the power transmitting coil are disposed around the rotational axis of the movable member. With this configuration, even when the movable member rotates, the positional relationship between the power receiving coil and the power transmitting coil can be kept within a constant range.

LIST OF REFERENCE NUMERALS

10 Power supply device
20 Power receiving unit
21 First coil board
22 First insertion hole
24 Power receiving coil
30 Power transmitting unit
31 Second coil board
32 Second insertion hole
34 Power transmitting coil
35 Power transmitting extension portion
40 Slack absorption portion
41 Case
42 Bottom wall portion
43 Peripheral wall portion
44 First guiding port
45 Winding portion
46 Accommodating groove
47 Second guiding port
50 Slide mechanism
51 Rail
52 Lower wall
53 Upper wall
54 Side wall
55 Slit
56 Slider
57 Rail insertion portion
58 Leg portion
59 Support plate portion
60 Rotation mechanism
61 Base pedestal
62 Seat pedestal
63 Flange portion
64 Seat support portion
Ar Rotational axis
B1, B2 Bolt
C Connector
F Floor
S Seat

What is claimed is:

1. A power supply device comprising:
a power receiving unit that includes a power receiving coil and a first coil board configured to support the power receiving coil, the power receiving unit being configured to move along with a movable member that is supplied with power from the power supply device and is movable relative to a vehicle body of a vehicle;
a power transmitting unit that includes a power transmitting coil disposed opposing the power receiving coil and configured to supply power to the power receiving coil in a contactless manner, a power transmitting extension portion extending from the power transmitting coil, and a second coil board configured to support the power transmitting coil, the power transmitting unit being configured to move along with the movable member and the power receiving unit; and
a slack absorption portion that includes a winding portion configured to wind and feed the power transmitting extension portion by rotating in coordination with movement of the movable member, and is attached to the power transmitting unit, wherein the first coil board and the second coil board are coaxially disposed and configured to rotate about a rotational axis of the movable member in coordination with rotation of the movable member.

2. The power supply device according to claim 1, wherein the movable member is rotatable relative to the vehicle body, and the power receiving coil and the power transmitting coil are disposed around the rotational axis of the movable member.

3. The power supply device according to claim 1, wherein the movable member is a seat.

4. The power supply device according to claim 1, wherein the winding portion is disposed on a bottom surface of the slack absorption portion, the second coil board is disposed above and opposing the winding portion, and the winding portion is coaxially disposed with respect to the second coil board.

5. The power supply device according to claim 1, wherein the first coil board and the second coil board are configured to move in coordination with linear movement of the movable member.

\* \* \* \* \*